United States Patent
Zhou et al.

(10) Patent No.: US 7,327,904 B2
(45) Date of Patent: Feb. 5, 2008

(54) PATTERN CLASSIFICATION AND FILTER DESIGN FOR INCREASING IMAGE RESOLUTION

(75) Inventors: Lingxiang Zhou, San Ramon, CA (US); Donghui Wu, Fremont, CA (US)

(73) Assignee: ArcSoft, Inc., Fremont, CA (US)

( * ) Notice: Subject to any disclaimer, the term of this patent is extended or adjusted under 35 U.S.C. 154(b) by 569 days.

(21) Appl. No.: 11/014,404

(22) Filed: Dec. 15, 2004

(65) Prior Publication Data
US 2006/0126960 A1    Jun. 15, 2006

(51) Int. Cl.
G06K 9/32 (2006.01)
G06K 15/00 (2006.01)
H04N 1/46 (2006.01)

(52) U.S. Cl. .................. 382/299; 382/300; 358/1.2; 358/525

(58) Field of Classification Search .............. 382/254, 382/260–261, 299, 300, 312; 358/1.2, 525, 358/528
See application file for complete search history.

(56) References Cited

U.S. PATENT DOCUMENTS 6,058,248 A    5/2000  Atkins et al.
6,519,368 B1 *  2/2003  Kondo et al. ............... 382/260
6,937,774 B1 *  8/2005  Specht et al. ............... 382/254
7,113,741 B2 *  9/2006  Chuberre et al. .......... 455/3.06
7,149,369 B2 * 12/2006  Atkins ........................ 382/299

OTHER PUBLICATIONS

C. B. Atkins, "Classification-Based Methods in Optimal Image Interplation," A Thesis submitted to the Faculty of Purdue University, Dec. 1998, pp. 1-95.

* cited by examiner

Primary Examiner—Kanjibhai Patel
(74) Attorney, Agent, or Firm—Patent Law Group LLP; David C. Hsia

(57) ABSTRACT

A method for improving image resolution includes (a) selecting a low-resolution pixel in a low-resolution image; (b) generating a vector that characterizes a low-resolution patch about the low-resolution pixel; (c) classifying the low-resolution patch into one of a plurality of possible patterns; (d) if said one pattern is one of a plurality of top ranking patterns having filters, applying a filter of said one of the top ranking patterns to the low-resolution patch to generate high-resolution pixels that correspond to the low-resolution pixel; (e) if said one pattern is not one of the plurality of top ranking patterns, applying an interpolation process to the low-resolution patch to generate the high-resolution pixels; (f) repeating steps (a) to (e) for additional low-resolution pixels to generate additional high-resolution pixels to form a high-resolution image.

16 Claims, 4 Drawing Sheets

PATTERN CLASSIFICATION AND FILTER DESIGN FOR INCREASING IMAGE RESOLUTION

FIELD OF INVENTION

This invention relates to a method to scale a low resolution image to a high resolution image.

DESCRIPTION OF RELATED ART

There are several methods to scale a low-resolution image to a high-resolution image. These methods include nearest neighbor interpolation, bicubic interpolation, and bilinear interpolation. These methods tend to generate blurry high-resolution images.

U.S. Pat. No. 6,058,248 (hereafter "Atkins et al.") describes a method that characterizes a multi-pixel area, or window, around a pixel that can benefit from resolution enhancement. To interpolate to a high resolution output, a set of spatial filters is applied to the data area based on the window characterization. The output of the resolution synthesizer is a set of multiple pixels for each input pixel, representing the source input pixel in a higher resolution enhanced version. The filters are chosen from a stored database created to fit input/output device requirements. The filters are created by fitting sample data into a certain number of classes (e.g., 100) and determining filters for each of those classes.

Atkins et al. has the following disadvantages. As the Atkins method creates filters that depend on the content of the sample data, the enlarged pictures consist of unwanted visual artifacts such as false edges and blurred features. The reason is that the training procedure in the Atkins method is unsupervised; therefore the trained cluster centers could be too dense or too sparse.

Thus, what is needed is a method that addresses the disadvantages of these previous methods.

BRIEF DESCRIPTION OF THE DRAWINGS

Use of the same reference numbers in different figures indicates similar or identical elements.

SUMMARY

In one embodiment of the invention, a method for improving image resolution includes (a) selecting a low-resolution pixel in a low-resolution image; (b) generating a vector that characterizes a low-resolution patch about the low-resolution pixel; (c) classifying the low-resolution patch into one of a plurality of possible patterns; (d) if said one pattern is one of a plurality of top ranking patterns having filters, applying a filter of said one of the top ranking patterns to the low-resolution patch to generate high-resolution pixels that correspond to the low-resolution pixel; (e) if said one pattern is not one of the plurality of top ranking patterns, applying an interpolation process to the low-resolution patch to generate the high-resolution pixels; (f) repeating steps (a) to (e) for additional low-resolution pixels to generate additional high-resolution pixels to form a high-resolution image.

DETAILED DESCRIPTION

Figure 1:
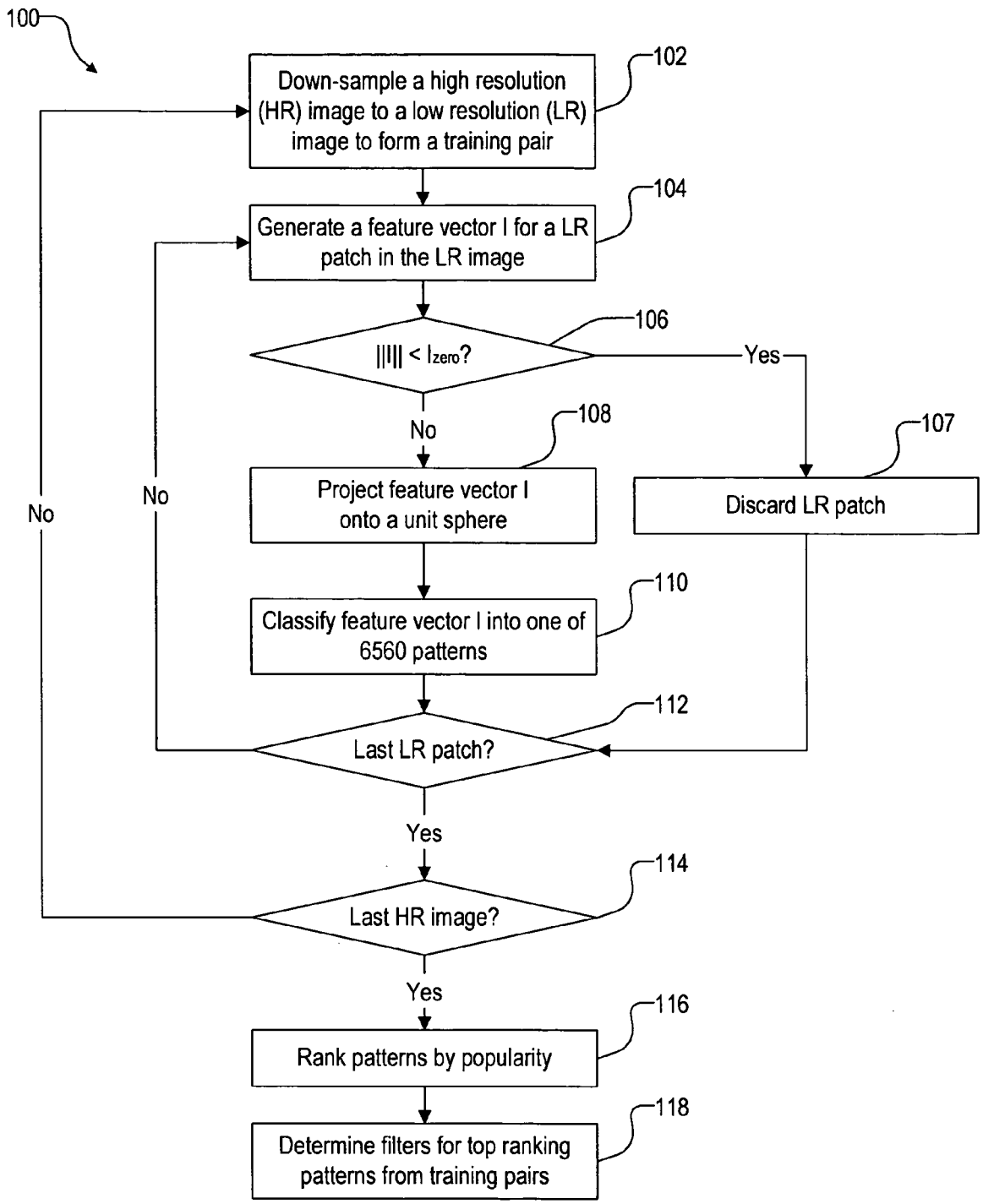
FIG. 1 is a flowchart of a method for determining filters for scaling a low-resolution image to a high-resolution image in one embodiment of the invention.

FIG. 1 is a flowchart of a method 100 to determine filters used to form a high-resolution (HR) image from a low-resolution (LR) image in one embodiment of the invention. Method 100 may be implemented by software, hardware, or a combination thereof. For example, method 100 can be implemented as software on a computer in order to print HR images from LR images captured by a digital camera.

In one embodiment, method 100 is used to double the resolution of the LR image. To do so, HR sample images are down-sampled to ½ of their original size. The corresponding pairs of HR and LR images are training pairs used to determine the filters. Each training pair is also rotated and mirrored to generate up to a total of eight training pairs. This provides isotropic samples that reduce content dependency and improve the quality of the resulting filters.

Figure 2:
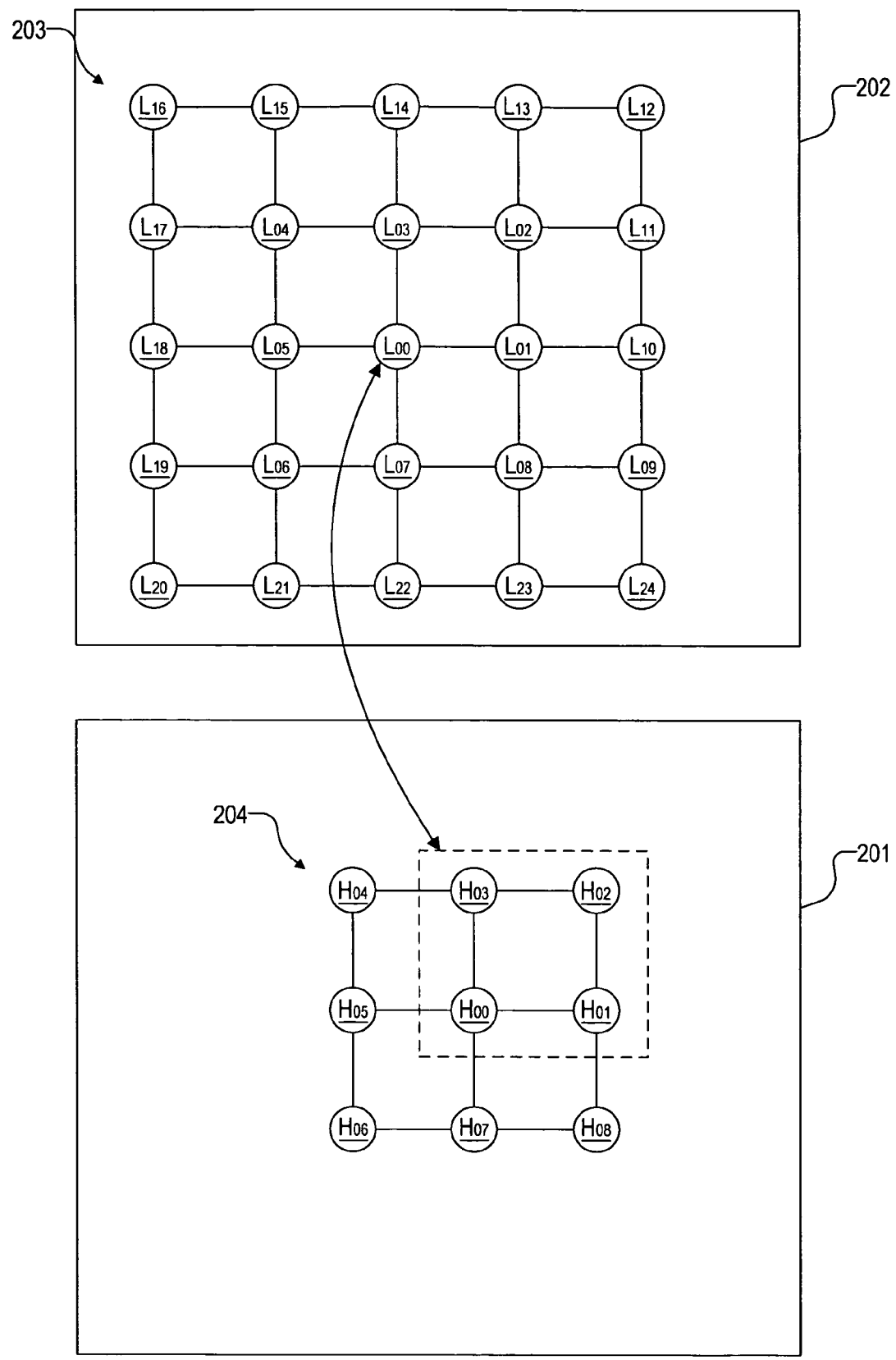
FIG. 2 illustrates the correspondence between a high-resolution image and a low-resolution image used to determine the filters of FIG. 1.

In step 102, an HR image 201 (FIG. 2) is selected from a large group of HR sample images (e.g., over a million HR sample images). HR sample image 201 is down-sampled to form a LR image 202 (FIG. 2).

In step 104, a target LR pixel $L_{00}$ (FIG. 2) is selected from LR image 202.

An LR patch 203 (FIG. 2) consisting of 5 by 5 LR pixels about target LR pixel $L_{00}$ is retrieved from LR image 202. LR patch 203 consists of LR pixels $L_{00}, L_{01}, \ldots, L_{24}$ (FIG. 2). In one embodiment, target LR pixel $L_{00}$ is located at the center of LR patch 203.

An HR patch 204 (FIG. 2) consisting of 3 by 3 HR pixels is retrieved from HR image 201. HR patch 204 consists of HR pixels $H_{00}, H_{01}, H_{02}$ and $H_{03}$ (FIG. 2) that correspond to target LR pixel $L_{00}$.

A feature vector I (i.e., a cluster vector) is then generated from LR patch 203 as follows:

$$I = \{I_0, I_2, \ldots, I_7\},$$

$$I_k = L_{k+1} - L_{00}, \text{ where } k=0, 1, \ldots, 7 \quad (1)$$

where I is the feature vector and $I_0, I_2, \ldots, I_7$ are the vector components. Note that while only a 4 by 4 LR patch is used to determine the filters, a 5 by 5 LR patch is retrieved to provide all the necessary LR pixels for rotating and mirroring the 4 by 4 patch around the target LR pixel. For example, in one orientation, the necessary pixels in a 4 by 4 LR patch are $\{L_{00} \ldots L_{15}\}$. In another orientation, the 4 by 4 patch is rotated by 90 degrees at the target LR pixel $L_{00}$ and the necessary pixels become $\{L_{00} \ldots L_{08}, L_{13} \ldots L_{19}\}$.

In step 106, the length of feature vector I is determined and compared with a threshold $I_{zero}$. If the length of feature vector I is less than threshold $I_{zero}$, then it is considered a smooth sample because target LR pixel $L_{00}$ has very little color difference with its neighboring pixels in LR patch 203 and it can be interpolated using conventional methods (e.g., bicubic interpolation). In one embodiment, $I_{zero}$ has been experimentally determined to be 7.68. If the length of feature vector I is less than threshold $I_{zero}$, step 106 is followed by step 107. Otherwise step 106 is followed by step 108.

In step 107, LR patch 203 is discarded because a filter will not be used on that patch to scale a LR pixel to HR pixels. Step 107 is followed by step 112.

In step 108, feature vector I is projected onto a 8-dimensional unit sphere as follows:

$$I \leftarrow I/\|I\| \qquad (2)$$

where $\|I\|$ is the length of the feature vector.

In step 110, LR patch 203 is classified into one of several patterns (i.e., clusters). Specifically, the distances between feature vector I and the pattern centers are determined and LR patch 203 belongs to the pattern that it is closest to. For an even distribution of all the possible patterns, the patterns are defined as:

$$C_i = [P_0, P_1, \ldots, P_7]$$

$$P_j(j=0, 1, \ldots, 7) \in (0, 1, -1) \qquad (3)$$

where vector $C_i$ is a pattern and $P_0, P_1, \ldots, P_7$ are the vector components. Note that the vector components are limited to three values of 0, 1, and −1 for an even distribution of all the possible patterns.

Thus, there are 6561 possible patterns. Excluding the all zero pattern, the total number of patterns is 6560. The pattern centers are determined by projecting the patterns onto the 8-dimensional unit sphere as follows:

$$C_i \leftarrow C_i/\|C_i\| \qquad (4)$$

where $\|C\|$ is the length of the pattern vector.

In step 112, it is determined if the last LR patch in LR image 202 has been processed. If so, step 212 is followed by step 214. Otherwise step 112 is followed by step 104 and the above steps are repeated until all the possible LR pixels in LR image 202 have been processed. LR pixels that are on the margin of LR image 202 are not selected in method 100 because part of their patches may be outside of LR image 202.

In step 114, it is determined if the last HR image in the HR sample images has been processed. If so, step 114 is followed by step 116. Otherwise step 114 is followed by step 104 and the above steps are repeated until all the HR samples have been processed.

In step 116, the 6560 patterns are ranked according to the number of LR patches that belong to each pattern.

In step 118, filters are determined for a selected number of the top ranking patterns using the corresponding HR and LR patches. In one embodiment, the top 16 patterns are separated into 16 classes as shown in the following table:

TABLE

| Class | Pattern | Number of variations |
| --- | --- | --- |
| Class 0: | +++00000 | (16) |
| Class 1: | +++0---0 | (8) |
| Class 2: | +++0+++0 | (8) |
| Class 3: | +0000000 | (16) |
| Class 4: | ++000000 | (16) |
| Class 5: | ++++++++ | (2) |
| Class 6: | +++++000 | (16) |
| Class 7: | ++++0000 | (16) |
| Class 8: | +++++++0 | (16) |
| Class 9: | +++00--0 | (32) |
| Class 10: | ++++---- | (8) |
| Class 11: | +++000+0 | (32) |
| Class 12: | +++00++0 | (32) |
| Class 13: | ++++0--0 | (16) |
| Class 14: | +000+000 | (8) |
| Class 15: | +++000-0 | (32) |

The brackets in Table 1 indicate the number of variations with three transformations of rotation, mirroring, and inversion of the signs. Note that the "+" and "−" represent the signs of the components. It is assumed that the variations of the top ranking patterns are also popular and therefore included in the same classes.

It has been determined that there are a total of 146 patterns in the top 10 classes, and 274 patterns in the top 16 classes. More importantly, it has been experimentally determined that the top 10 classes cover about 57% of the non-smooth samples and the top 16 classes cover 71% of the non-smooth samples. In summary, it has been determined that a small number of patterns out of the possible 6560 patterns can cover a vast majority of image contents.

In one embodiment, filters are determined for the patterns in the top 16 classes. The filters can be determined by conventional least-mean-square (LMS) estimation. In one embodiment, the filters are initially determined with all the corresponding HR and LR patches in a first pass. The initial filters are used to generate high resolution pixels that are compared with the actual high resolution pixels. Outlier data are then discarded and only ⅔ of the best fit samples are used again to determine the filters in a second pass.

To speed up run-time process of scaling a LR image, the top ranking patterns and their filters can be divided into the 8 quadrants of the unit sphere.

Figure 3:
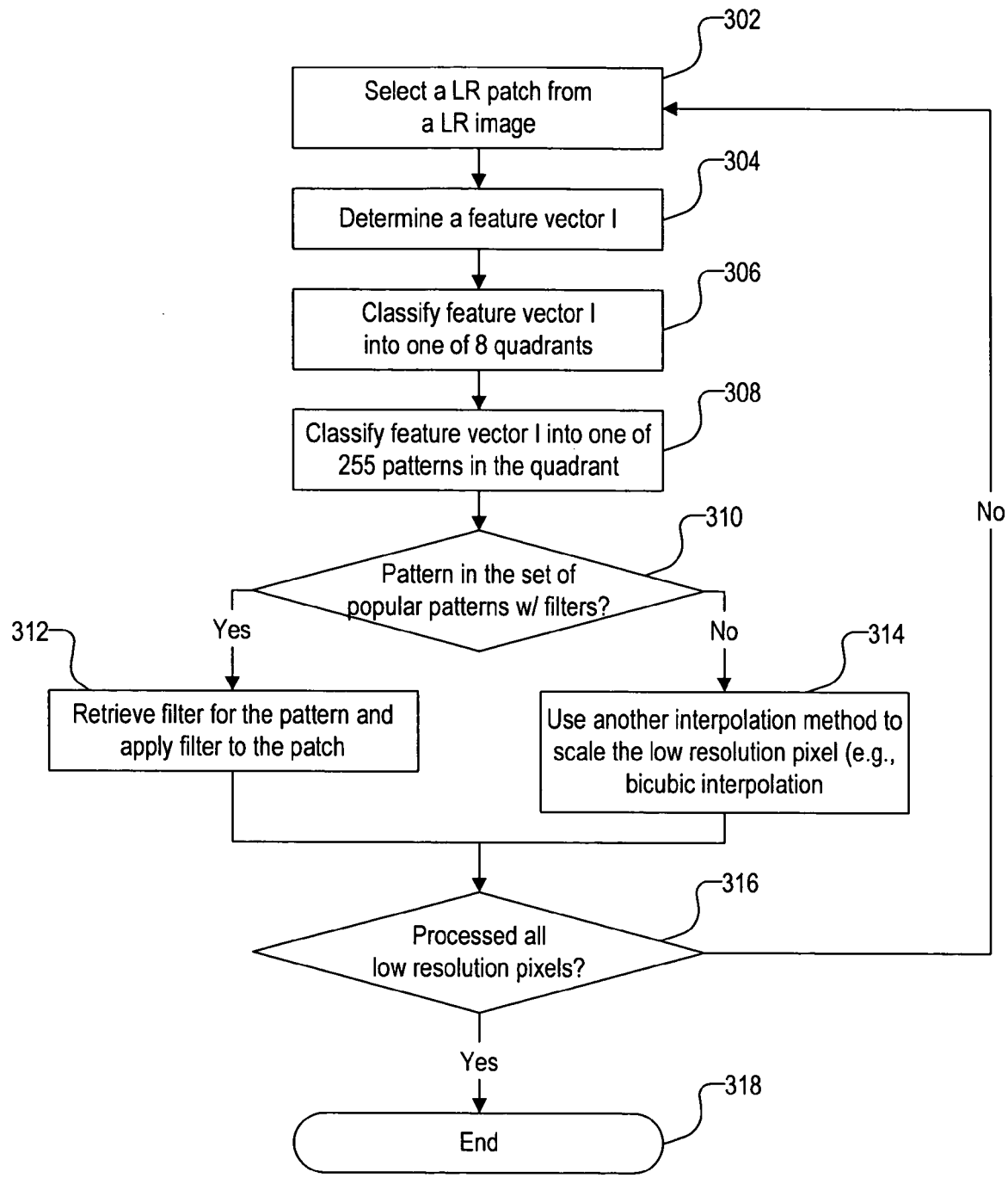
FIG. 3 is a flowchart of a method for applying the filters of FIG. 1 to scale a low-resolution image to a high-resolution image in one embodiment of the invention.

FIG. 3 is a flowchart of a method 300 to apply the filters to scale a LR image 401 (FIG. 4) into a HR image 402 (FIG. 4) in one embodiment of the invention. Method 200 may be implemented by software, hardware, or a combination thereof. In one embodiment, the filters are the 274 filters determined in method 100 (FIG. 1)

Figure 4:
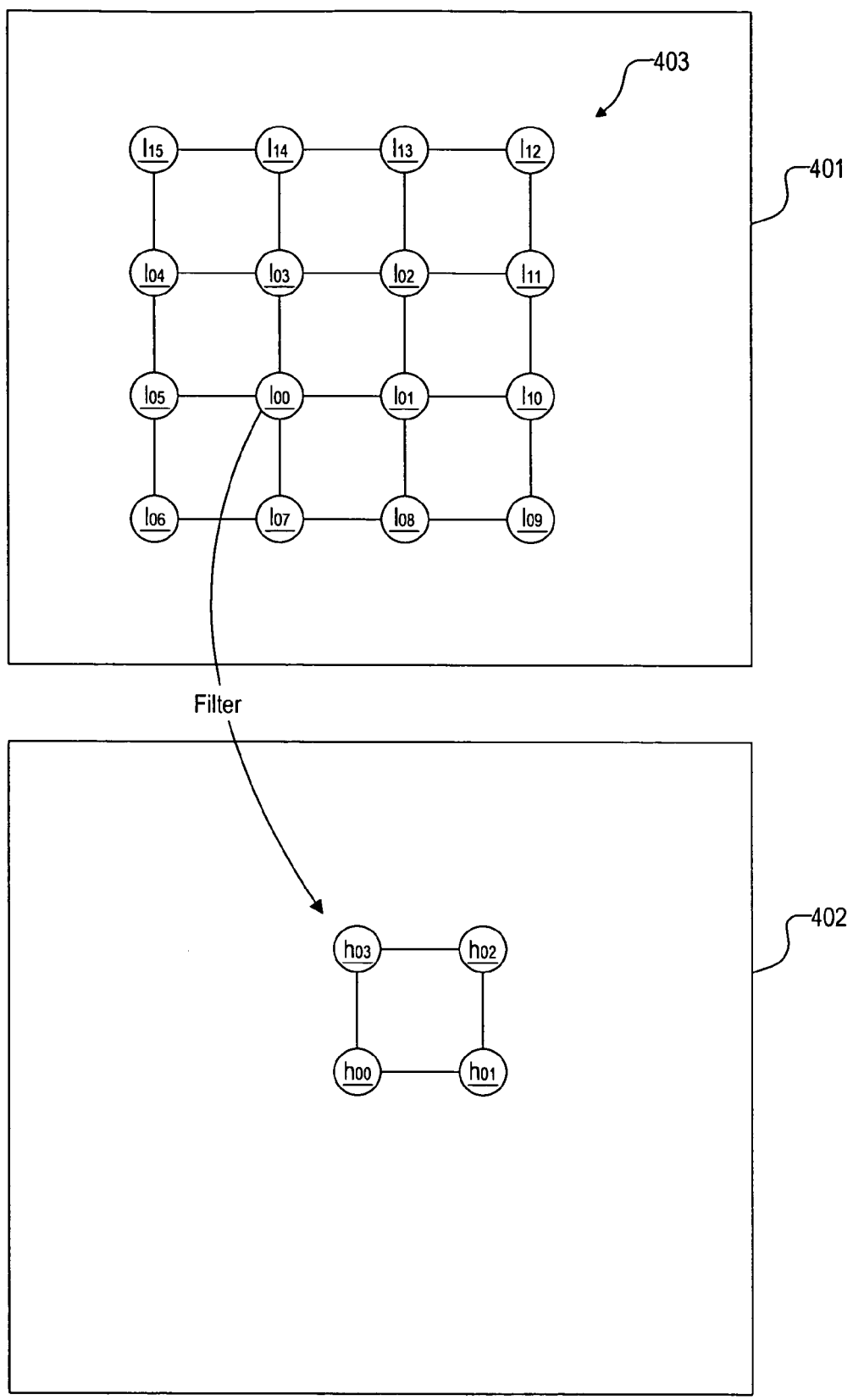
FIG. 4 illustrates the correspondence between a low-resolution image and a high-resolution image generated from the method of FIG. 3.

In step 302, a target LR pixel $l_{00}$ is selected from LR image 401. An LR patch 403 (FIG. 4) about target pixel $l_{00}$ is retrieved for scaling to 4 HR pixels. LR patch 403 consists of LR pixels $l_{00}, l_{01}, \ldots l_{08}$ (FIG. 4). Note that lower case "l" is used instead of uppercase "L" to distinguish between the pixels in methods 300 and 100. Note also that the 4 by 4 LR patch is more efficiently handled by computer hardware than the 5 by 5 LR patch used in the Atkins et al.

In step 304, a feature vector I of LR patch 403 is determined as follows:

$$I = \{I_0, I_2, \ldots, I_7\}$$

$$I_k = l_{k+1} - l_{00}, \text{ where } k=0, 1, \ldots, 7 \qquad (5)$$

In step 306, LR patch 403 is classified into one of eight quadrants in the 8-dimensional unit sphere by the signs of components of feature vector I.

In step 308, LR patch 403 is classified in one of 255 patterns in the quadrant. This is because many patterns are located right on the axes planes between quadrants. 255 comes from $2^8-1$, where the number of dimensions is 8 and for each dimension there are 2 choices of the value (either 0 or +1/−1). Specifically, the distances between feature vector I and the pattern centers are determined and LR patch 403 belongs to the pattern that it is closest to.

In step 310, it is determined if the pattern which LR patch 403 belongs to is one of the 274 top ranking patterns. If so, then step 310 is followed by step 312. Otherwise step 310 is followed by step 314.

In step 312, the filter for the pattern which LR patch 403 belongs to is applied to LR patch 403 to generate HR pixels $h_{00}, h_{01}, h_{02},$ and $h_{03}$ (FIG. 4) that correspond to LR pixel $l_{00}$. Note that lower case "h" is used instead of uppercase "H" to distinguish between the pixels in methods 300 and 100. HR pixels $h_{00}$ to $h_{03}$ are then saved in HR image 402 corresponding to LR image 401. Step 312 is followed by step 316.

In step 314, a conventional interpolation (e.g., bicubic interpolation) is used to generate HR pixels $h_{00}$ to $h_{03}$ from target pixel $L_{00}$. Step 314 is followed by step 316.

In step 316, it is determined if all the possible LR pixels in LR image 401 have been processed. If not, step 316 is followed by step 302 and method 300 repeats until all the possible LR pixels have been processed. Otherwise step 316 is followed by step 318, which ends method 300. LR pixels that are on the margin of LR image 401 are not selected in method 300 because part of their patches may be outside of LR image 401.

Methods 100 and 300 are based on grayscale images. However, methods 100 and 300 can be adopted for color images.

In one embodiment, the color image is separated into YUV channels. Methods 100 and 300 are applied to only the Y channel while conventional cubic interpolation is used for U and V channels. The results are merged to generate the high resolution image.

In another embodiment, the color image is separated into RGB channels. Methods 100 and 300 are applied to the G channel to determine the filters to be applied. The same filter is then applied to the R and B channel. The results are then merged to generate the high resolution image.

Various other adaptations and combinations of features of the embodiments disclosed are within the scope of the invention. Numerous embodiments are encompassed by the following claims.

What is claimed is:

1. A method for determining filters for improving image resolution, comprising:
   (a) generating a low-resolution sample image from a high-resolution sample image;
   (b) generating a vector that characterizes a low-resolution patch about a low-resolution pixel in the low-resolution sample image;
   (c) classifying the low-resolution patch into one of a plurality of possible patterns by comparing the vector and the patterns;
   (d) repeating steps (a) to (c) for additional low-resolution pixels to classify additional low-resolution patches into the possible patterns;
   (e) repeating steps (a) to (d) for additional high-resolution sample images;
   (f) ranking the possible patterns by number of low-resolution patches classified into the possible patterns;
   (g) determining filters for a plurality of high ranking patterns from the possible patterns using the low-resolution patches classified into the high ranking patterns and corresponding high-resolution patches in corresponding high-resolution sample images.

2. The method of claim 1, wherein said generating a low-resolution sample image from a high-resolution sample image comprises down-sampling the high-resolution sample image.

3. The method of claim 1, wherein said generating a vector comprises:

$$I = \{I_0, I_2, \ldots, I_7\}$$

$$I_k = L_{k+1} - L_{00}, \text{ where } k=0, 1, \ldots, 7$$

where I is the vector, $L_{00}$ is the low-resolution pixel, and $L_{k+1}$ is a neighboring pixel around the low-resolution pixel in the low-resolution patch.

4. The method of claim 1, further comprising, between steps (b) and (c), skipping step (c) for the low-resolution patch if a length of the vector is less than a threshold.

5. The method of claim 1, wherein said classifying the low-resolution patch into one of a plurality of possible patterns comprises determining distances between the vector and the possible patterns both projected onto a unit sphere, the low-resolution patch belonging to a pattern having the smallest distance.

6. The method of claim 1, wherein the possible patterns comprises:

$$C_i = [P_0, P_1, \ldots, P_7]$$

$$P_j (j=0, 1, \ldots, 7) \in (0, 1, -1)$$

where vector $C_i$ is a possible pattern and $P_j$ is a component of vector C.

7. The method of claim 1, wherein the high ranking patterns comprises the top 274 patterns from the possible patterns.

8. The method of claim 1, wherein said determining filters for a plurality of high ranking patterns comprises applying a least-mean-square estimation on the low-resolution patches classified into the high ranking patterns and the corresponding high-resolution patches.

9. The method of claim 1, wherein the high ranking patterns, including their variations, comprise:

| Class | Pattern | Number of variations |
|---|---|---|
| Class 0: | +++00000 | (16) |
| Class 1: | +++0---0 | (8) |
| Class 2: | +++0+++0 | (8) |
| Class 3: | +0000000 | (16) |
| Class 4: | ++000000 | (16) |
| Class 5: | ++++++++ | (2) |
| Class 6: | +++++000 | (16) |
| Class 7: | ++++0000 | (16) |
| Class 8: | +++++++0 | (16) |
| Class 9: | +++00--0 | (32) |
| Class 10: | ++++---- | (8) |
| Class 11: | +++000+0 | (32) |
| Class 12: | +++00++0 | (32) |
| Class 13: | ++++0--0 | (16) |
| Class 14: | +000+000 | (8) |
| Class 15: | +++000-0 | (32). |

10. The method of claim 1, wherein the high ranking patterns and their patterns are divided into a plurality of quadrants of the unit sphere.

11. The method of claim 1, further comprising:
   (h) selecting another low-resolution pixel in a low-resolution target image;
   (i) generating another vector that characterizes another low-resolution patch about the another low-resolution pixel;
   (j) classifying the another low-resolution patch into another one of the plurality of possible patterns;
   (k) if said another one pattern is one of the high ranking patterns:
      retrieving a filter for said another one pattern;
      applying the filter to the low-resolution target patch to generate high-resolution pixels that correspond to the another low-resolution pixel;
   (l) if said one pattern is not one of the high ranking patterns:
      applying an interpolation process to the low-resolution target patch to generate the high-resolution pixels;

(m) repeating steps (h) to (l) for other low-resolution pixels to generate other high-resolution pixels to form a desired high-resolution image.

12. A method for improving image resolution, comprising:

(a) selecting a low-resolution pixel in a low-resolution image;

(b) generating a vector that characterizes a low-resolution patch about the low-resolution pixel;

(c) classifying the low-resolution patch into one of a plurality of possible patterns;

(d) if said one pattern is one of a plurality of high ranking patterns having filters:

retrieving a filter for said one pattern;

applying the filter to the low-resolution patch to generate high-resolution pixels that correspond to low-resolution pixel;

(e) if said one pattern is not one of the high ranking patterns:

applying an interpolation process to the low-resolution patch to generate the high-resolution pixels;

(f) repeating steps (a) to (e) for additional low-resolution pixels to generate additional high-resolution pixels to form a high-resolution image.

13. The method of claim 12, wherein said generating a vector comprises:

$$I = \{I_0, I_2, \ldots, I_7\}$$

$$I_k = l_{k+1} - l_{00}, \text{ where } k = 0, 1, \ldots, 7$$

where I is the vector, $l_{00}$ is the low-resolution pixel, and $l_{k+1}$ is a neighboring pixel around the low-resolution pixel in the low-resolution patch.

14. The method of claim 12, wherein said classifying the low-resolution patch into one of a plurality of possible patterns comprises:

classifying the low-resolution patch into one of a plurality of quadrants of a unit sphere;

classifying the low-resolution patch into one of a plurality of patterns in said one quadrant.

15. The method of claim 14, wherein said classifying the low-resolution patch into one of a plurality of quadrant comprises using the sign of components of the vector to classify the low-resolution patch.

16. The method of claim 14, wherein said classifying the low-resolution patch into one of a plurality of patterns in said quadrant comprises determining distances between the vector and the patterns both projected onto a unit sphere, the low-resolution patch belonging to a pattern having the smallest distance.

* * * * *